Jan. 1, 1924.

M. STANDISH

BEARING BOLT

Filed Jan. 26, 1922

Witness:
R. Burkhardt

Inventor:
Myles Standish,
By Wilkinson, Huxley, Byron & Knight
attys.

Patented Jan. 1, 1924.

1,479,261

UNITED STATES PATENT OFFICE.

MYLES STANDISH, OF OMAHA, NEBRASKA.

BEARING BOLT.

Application filed January 26, 1922. Serial No. 531,910.

*To all whom it may concern:*

Be it known that I, MYLES STANDISH, a citizen of the United States, residing at Omaha, in the county of Douglas and State of Nebraska, have invented certain new and useful Improvements in Bearing Bolts, of which the following is a specification.

This invention relates to a new and improved bearing bolt and more specifically to a bearing bolt assembly adapted to automatically move the nut upon the bolt to take up wear in the bearing.

In the bearings such as those upon the piston rods of internal combustion engines, a considerable wear takes place and this wear causes knocks in the engine. With ordinary types of bolts, it is necessary to periodically take down engines to tighten up the bearing bolts and thus eliminate the knocks which develop due to the wear.

By the use of my improved bolt, the wear is automatically taken up and the development of knocks prevented. This results not only in the prevention of the bad effect upon the engine due to the knocks but reduces the wear upon the bearings since they are constantly kept tight. It further results in a saving of expense and lost time caused by taking down the engine as required with an ordinary construction. These bolts are commonly applied to such engines in such positions that it is relatively difficult to reach the bolts for purposes of application or adjustment. With some types of engines, they are reached only from below the machine. When manipulated from such positions, it is difficult for the mechanic to get two hands on the work and it is, therefore, highly desirable that a bolt be capable of application and of adjustment by means of one hand.

Various types of bolts have been evolved in the endeavor to provide a bolt which will take up wear in this manner but I have found that certain of them failed to operate for the reason that threads formed upon that portion of the bolt which engages the bearing members serve to prevent or impede movement of the members under the influence of the nut and thus the wear is not properly taken up.

It is an object of the present invention to provide a bearing bolt assembly adapted to automatically keep the nut in clamping contact with the bearing member to take up wear in the bearing.

It is a further object to provide an assembly which may be readily applied, adjusted and removed with one hand.

It is an additional object to provide a nut and bolt so related that the threads upon the bolt are entirely enclosed within the nut assembly and wherein the nut has a range of movement for taking up wear, throughout which range the threads are so enclosed.

It is also an object to provide a bearing bolt assembly which is simple in construction, relatively inexpensive in manufacture and composed of but few parts.

Other and further objects will appear as the description proceeds.

Broadly, my invention comprises a bearing bolt assembly comprising a threaded bolt, a nut threaded on said bolt, a follower associated with the nut by means of a spring, a member adapted to be non-rotatably secured to the bolt beyond the follower, said member and follower being adjustably associated in such manner as to vary the tension upon the spring.

I have illustrated a preferred embodiment of my invention in the accompanying drawings, in which—

Figure 1:
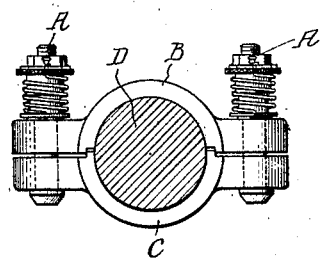
Figure 1 is an elevation showing bearing members which are retained in place by means of a pair of my bolt assemblies.

As shown in Figure 1, the two bearing assemblies A serve to retain the bearing members B and C in close engagement with the shaft D.

Figure 2:
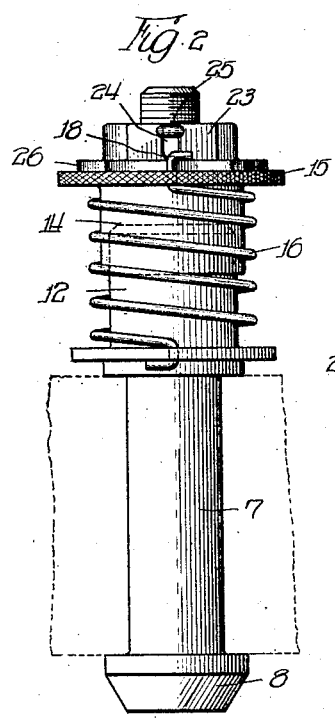
Figure 2 is an enlarged elevation of the bolt assembly.
Figure 4:
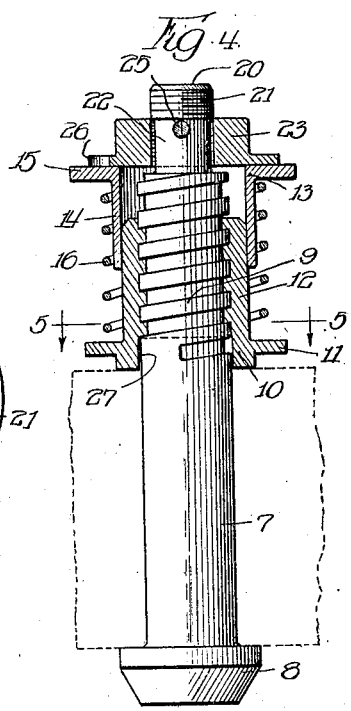
Figure 4 is a view similar to Figure 2, the nut follower and ratchet member being shown in section.
Figure 5:
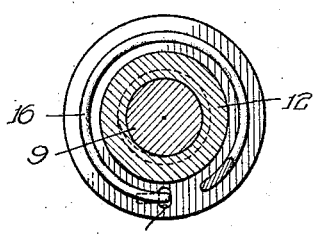
Figure 5 is a section taken on line 5—5 of Figure 4.

Referring now to the assembly in detail, as best shown in Figures 2 and 4, it comprises the bolt 7 having the usual head 8. Fitted upon the threaded portion 9 of the bolt is the nut 10. This nut is provided with a circumferential flange 11 and the rearwardly extending sleeve portion 12. The follower 13 is provided with the sleeve portion 14 adapted to fit around the portion 12 of the nut. The sleeve has the knurled flange 15 extending therefrom. The spring 16 encircles the sleeve portions of the nut and follower, one end of this spring being connected to the flange 11 of the nut through the opening 17 as shown in Fig. 5. The opposite end 18 of the spring extends through the radially elongated slot 19 in the flange 15 of the follower.

Figure 3:
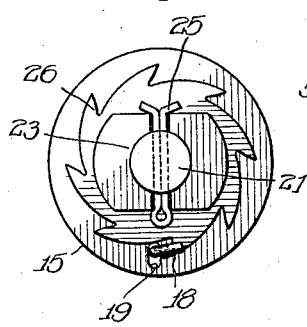
Figure 3 is a view of Figure 2 as seen from above.

The bolt is provided with the reduced extension 20, the outer portion of which is provided with the left hand thread 21. That portion of the extension intermediate the threaded portion and the main body of the bolt is smooth, being cut away to the base of the threads. The member 23 is provided with the threaded opening adapted to be screwed over the portion 21 of the extension and to rotatably fit upon the smooth relieved portion 22. The member 23 is provided with the slot 24 which is adapted to receive the cotter pin 25. This pin is passed through an opening in the bolt extension as best shown in Figures 3 and 4. The member 23 is further provided with the radially extending ratchet teeth 26. As best shown in Figures 2 and 3, the end 18 of the spring 16 is bent a distance beyond the flange 15 sufficient for this end of the spring to engage the teeth 26. The teeth serve to move the end of the spring radially outwardly in the slot 19 while the end is drawn inwardly against the teeth by the tension of the spring.

In assembling my bolt upon the bearing members, the bolt is passed through the bearing and bearing cap, and the nut together with the knurled follower are threaded by hand upon the bolt until the nut is brought firmly against the bearing cap. During this operation, the nut and follower are held together by their interengaging sleeve portions and by the spring. When the hand is removed, the follower is held up by the spring so that it will not fall off the bolt.

The ratchet member is then screwed into place by means of the left hand thread. The rotation upon the left hand thread is such that the teeth do not function in relation to the end of the spring. When the ratchet member has passed on to the smooth portion of the extension, it is rotated to aline notch 24 with the cotter pin hole in the bolt and the cotter pin is inserted. The threaded portion 21 holds the nut from dropping off the bolt while it is being rotated to aline the openings and while the cotter pin is being inserted, thus making the whole process readily carried out by one hand.

The entire assembly is now in a position without there being any tension whatever upon the spring. It is now a simple matter to rotate the follower by means of its knurled disk portion in the proper direction to put tension upon the spring, that is, in the clockwise direction as seen in Figure 3.

The end 18 of the spring engages the ratchet teeth to maintain the spring under this tension when the knurled disk is released.

An advantage of this construction lies in the fact that the bearing cap when placed in position is secured by both bolts without there being any tension on the spring. Tension can then be applied equally upon each bolt by merely counting the number of teeth through which the spring progresses in turning the knurled disk upon each bolt.

In removing the bolt assembly, the cotter pin is first removed and the spring tension then immediately rotates the ratchet member until the tension is relieved. The ratchet member may then be readily disengaged from the end of the spring and may be turned off of the left hand thread and removed from the bolt. The nut is then removed by rotating it and turning it off the right hand thread which it engages. The follower and spring are moved with the nut.

It will be noted that the face of the nut in bored at 27 so that the face of the nut in engagement with the bearing cap extends beyond the threaded portion of the bolt. There are thus no threads on the portion of the bolt within the bearing cap and the cap is easily adjustable upon the smooth surface of the bolt. The thread upon the bolt is also brought up the full depth to its end in order to aid in presenting the smooth surface in this manner. The nut may thus be brought up so that its threaded portion extends fully to the end of the threaded portion of the bolt and its counterbored portion extends beyond the thread of the bolt.

The form of the invention illustrated is the preferred embodiment but I am aware that various changes may be made to adapt the bolt to varying constructions and conditions. It is my intention to cover all modifications coming within the spirit and scope of the appended claims.

I claim:

1. A bearing bolt assembly comprising a threaded bolt, a nut threaded on said bolt, a follower on the bolt, the nut and follower having overlapping sleeves extending therefrom, a spring having its opposite ends secured to the nut and follower and encircling the sleeves, and a member secured to the bolt beyond the follower and associated with the follower in such manner as to maintain the follower in adjusted circumferential relation to the bolt.

2. A bearing bolt assembly comprising a threaded bolt, a nut threaded on said bolt, a follower on the bolt, a spring having its opposite ends secured to the nut and follower, and a member secured to the bolt beyond the follower, the spring engaging the member in such manner as to maintain the spring in adjusted relation to the bolt.

3. A bearing bolt assembly comprising a threaded bolt, a nut threaded on said bolt, a follower on the bolt, a spring having its opposite ends secured to the nut and follower, and a member secured to the bolt beyond the follower, the spring extending beyond the follower and engaging the member in such manner as to maintain the spring and follower in adjusted relation to the bolt.

4. A bearing bolt assembly comprising a threaded bolt, a nut threaded on said bolt, a follower supported by the nut out of engagement with the threads, the follower being rotatable relative to the nut, a spring having its opposite ends secured to the nut and follower, and a member secured to the bolt beyond the follower and associated with the follower in such manner as to maintain the follower in adjusted circumferential relation to the bolt.

5. A bearing bolt assembly comprising a threaded bolt, a nut threaded on said bolt, a follower supported by the nut out of engagement with the threads, the follower being rotatable relative to the nut, a spring having its opposite ends secured to the nut and follower, and a member secured to the bolt beyond the follower, the spring extending beyond the follower and engaging the member in such manner as to maintain the spring and follower in adjusted relation to the bolt.

6. A bearing bolt assembly comprising a threaded bolt, a nut threaded on said bolt, a follower supported by the nut out of engagement with the threads, the follower being rotatable relative to the nut, a spring having its opposite ends secured to the nut and follower, and a ratchet member secured to the bolt beyond the follower, the spring extending through a slot in the follower and engaging the ratchet member in such manner as to adjustably maintain the follower in adjusted circumferential relation to the ratchet member.

7. A bearing bolt assembly comprising a threaded bolt, a nut threaded on said bolt, a follower on the bolt, a spring having its opposite ends secured to the nut and follower, and a ratchet member fixedly secured to the bolt beyond the follower, the ratchet member being provided with radially extending ratchet teeth, the end of the spring extending beyond the follower in such manner as to adjustably engage the ratchet teeth.

8. A bearing bolt assembly comprising a threaded bolt, a nut threaded on said bolt, a follower on the bolt, a spring having its opposite ends secured to the nut and follower, and a ratchet member fixedly secured to the bolt beyond the follower, the ratchet member being provided with radially extending ratchet teeth, the end of the spring extending through a radially extended slot in the follower in such manner as to adjustably engage the ratchet teeth.

9. A bearing bolt assembly comprising a threaded bolt, a nut threaded on said bolt, the nut being counterbored whereby its face may extend beyond the end of the thread on the bolt toward the head of the bolt, a follower on the bolt, a spring having its opposite ends secured to the nut and follower, and a member secured to the bolt beyond the follower and associated with the follower in such manner as to maintain the follower in adjusted circumferential relation to the bolt.

10. A bearing bolt assembly comprising a bolt having a right hand thread thereon, a nut fitting said thread, a follower on the bolt, a spring connecting the follower and nut, a reduced extension on the bolt having a left hand thread thereon, and a member fitting on said extension and non-rotatably secured thereto, the follower being adjustably associated with said member to vary the tension on said spring.

11. A bearing bolt assembly comprising a bolt having a right hand thread thereon, a nut fitting said thread, a follower on the bolt, a spring connecting the follower and nut, a reduced extension on the bolt having a left hand thread on the outer end thereof, the inner portion thereof being smooth and a member adapted to be threaded over said threaded portion and to fit rotatably on said smooth portion and means to secure the member against rotation, the follower being adjustably associated with said member to vary the tension on said spring.

Signed at Omaha, Nebraska, this 21st day of January, 1922.

MYLES STANDISH.